US012656666B2

(12) United States Patent
Mody

(10) Patent No.: US 12,656,666 B2
(45) Date of Patent: Jun. 16, 2026

(54) CARRIER CARD APPARATUS AND METHOD FOR INSTALLATION AND REMOVAL OF LENS PROTECTORS

(71) Applicant: CASE-MATE, INC., Atlanta, GA (US)

(72) Inventor: Saumil Chetan Mody, Atlanta, GA (US)

(73) Assignee: Case-Mate, Inc., Atlanta, GA (US)

( * ) Notice: Subject to any disclaimer, the term of this patent is extended or adjusted under 35 U.S.C. 154(b) by 326 days.

(21) Appl. No.: 18/525,732

(22) Filed: Nov. 30, 2023

(65) Prior Publication Data

US 2025/0180973 A1 Jun. 5, 2025

(51) Int. Cl.
*G03B 17/56* (2021.01)
*G03B 11/04* (2021.01)
*H04M 1/02* (2006.01)
*G02B 13/00* (2006.01)

(52) U.S. Cl.
CPC .......... *G03B 17/566* (2013.01); *G03B 11/041* (2013.01); *H04M 1/0264* (2013.01); *G02B 13/0015* (2013.01); *G03B 2217/002* (2013.01)

(58) Field of Classification Search
CPC ................ G03B 17/566; G03B 11/041; G03B 2217/002; G03B 30/00; G03B 11/045; H04M 1/0264; H04M 1/0203; G02B 13/0015; G02B 5/00; G02B 13/0055; G02B 27/0006; G02B 7/004; G65D 69/00; B25F 1/00; H04N 23/55; B65D 69/00
See application file for complete search history.

(56) References Cited

U.S. PATENT DOCUMENTS

| | | | | |
|---|---|---|---|---|
| 2,291,821 | A | * | 8/1942 | McNabb ................ G03B 17/12 |
| | | | | 359/511 |
| D827,408 | S | * | 9/2018 | Stefanczyk-Lacor .......... D8/105 |
| 2018/0106986 | A1 | * | 4/2018 | Xu ......................... G02B 7/021 |
| 2024/0406530 | A1 | * | 12/2024 | Lin ..................... H04M 1/0264 |

FOREIGN PATENT DOCUMENTS

TW 648689 U * 11/2023

OTHER PUBLICATIONS

Screen captures from YouTube video clip entitled "Spigen iPhone Camera Lens Screen Protector—GLAStR EZ Fit Optik Pro Explained!" 13 pages, uploaded on Nov. 19, 2023 by user "asm_sannu". Retrieved from Internet: <https://www.youtube.com/watch?v=4bLcm4k3Djs>.*
Strauss, Paul "Guardman Comb Multitool", Jul. 10, 2017 [retrieved on Dec. 13, 2025] from internet <https://theawesomer.com/guardman-comb-multitool/434586/>.*

(Continued)

*Primary Examiner* — Christopher E Mahoney
(74) *Attorney, Agent, or Firm* — Perilla Knox Hildebrandt Staley & Amy LLP

(57) ABSTRACT

An apparatus for installation and removal of a lens protector to and from a lens, for example a lens of a mobile phone camera or other device to be protected. A carrier body retains at least one lens protector in a delivery position for installation of the lens protector onto the lens of the device. The apparatus also includes a removal tool that is part of the carrier and is configured for removal of the lens protector from the lens of the device.

21 Claims, 7 Drawing Sheets

(56) References Cited

OTHER PUBLICATIONS

GSMARENA "Samsung Galaxy A24 4G", [retrieved on Dec. 12, 2025] retrieved from internet <https://www.gsmarena.com/samsung_galaxy_a24_4g-12176.php>.*

IPhone 15 Series Optik Pro Lens Protector—Spigen.com Official Site—Spigen Inc., pp. 1-7.

Hoda iPhone 15 Series Sapphire Lens Protector Install / Remove—YouTube, available at https://www.youtube.com/watch?v=m1EUkvM1Qc8. Available Oct. 12, 2023. Accessed Mar. 17, 2026.

* cited by examiner

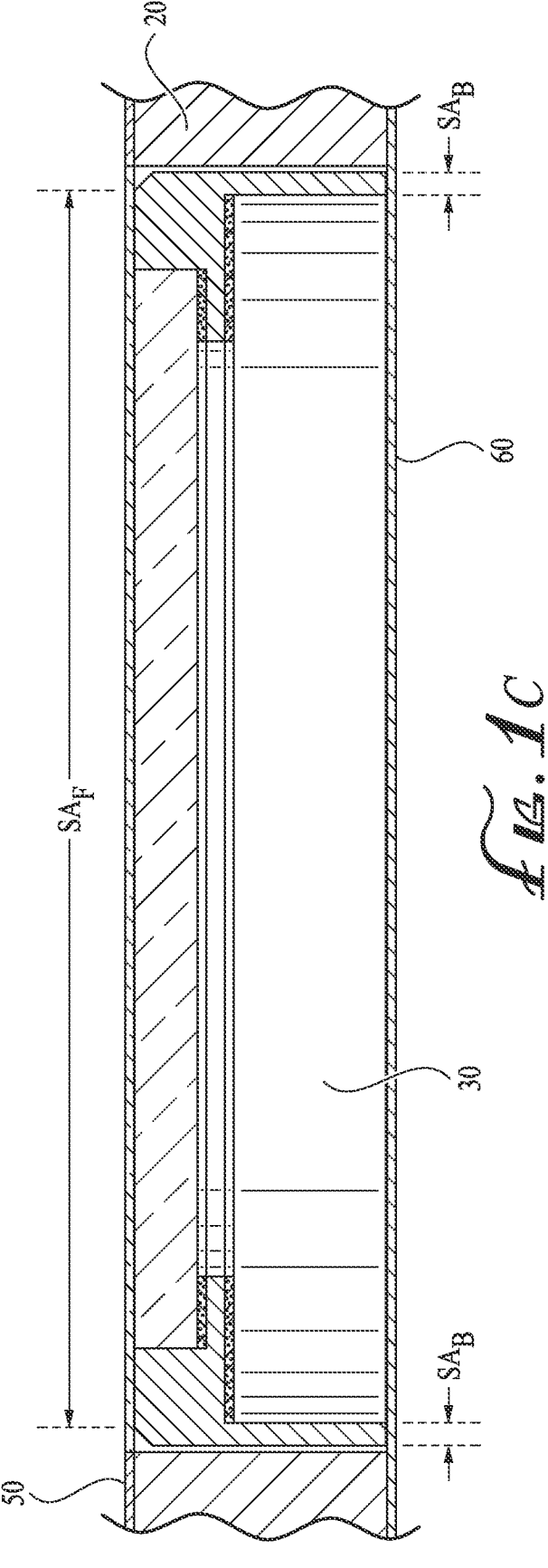
_Fig. 1c_

KEEP THIS TOOL

PRESS

PRESS

PRESS

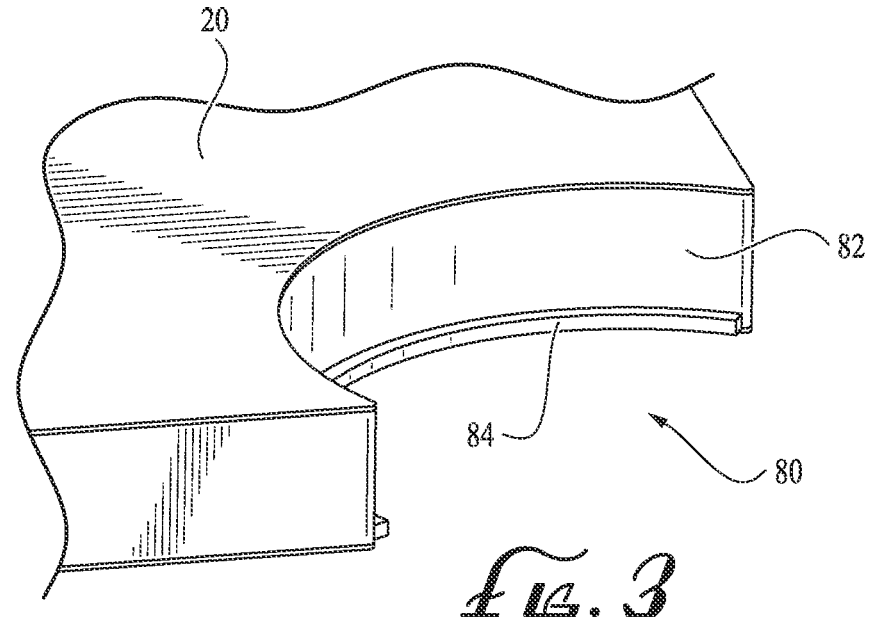
_Fig.3_
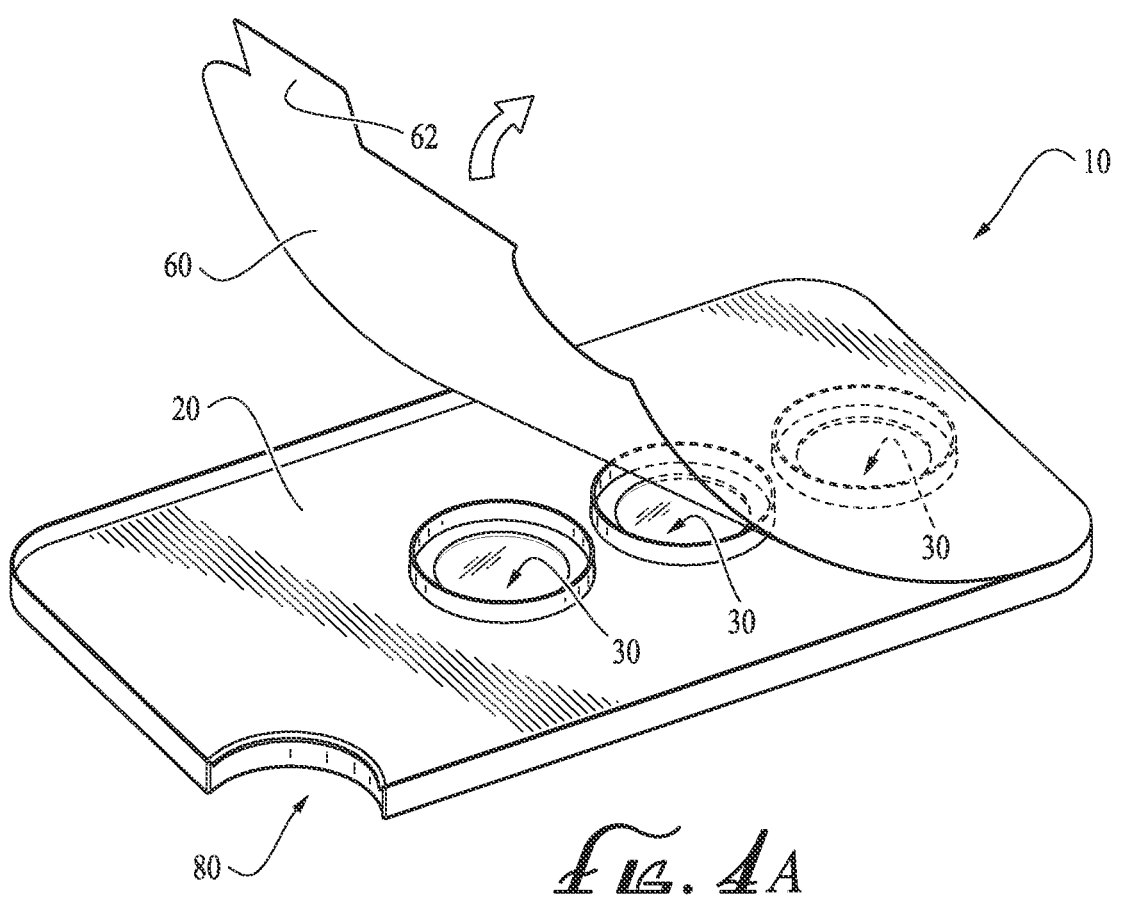
_Fig.4A_

CARRIER CARD APPARATUS AND METHOD FOR INSTALLATION AND REMOVAL OF LENS PROTECTORS

TECHNICAL FIELD

The present invention relates generally to the field of accessories for protection of components including optical lenses, for example camera lenses of electronic and/or optical devices and, and in more particular example embodiments to lens protectors for protecting camera lenses of mobile electronic devices and to apparatus and methods for installing and removing such lens protectors.

BACKGROUND

Electronic and optical devices such as mobile phones, tablet or laptop computers, cameras and magnification devices commonly include optical lenses and/or other components or features susceptible to scratching, chipping, or other damage. Replaceable or sacrificial protective elements such as lens protectors or lens covers may be utilized to protect such components or features from damage. For example, a ring-shaped lens protector or lens cover may be provided for installation over a camera lens of a mobile phone or tablet computer, with a clear protective cover panel configured to overlie and protect the external optical surface of the camera lens, and with an annular ring or collar configured to fit around the outer circumference of the lens and hold the protective cover panel in place.

Such covers may be retained in place over the lens by a friction fit and/or releasable adhesive, whereby the cover can be removed and replaced if scratched, chipped or otherwise damaged, without damage to the protected camera lens. It has been found that installation and removal of such lens covers or other protective elements can be difficult, tedious and time-consuming. Additionally, manual placement and attachment of the lens protectors can leave fingerprints or debris on the lens, the cover panel or between the protected lens and the lens protector, which may negatively affect optical performance of the camera or other device. Removal of such protective devices may also be difficult, sometimes requiring a tool, which a user may not have readily available. In some instances, lens protectors may be sold along with a separate plastic crowbar style removal tool, but such tools may be less effective than desired and prone to breakage or loss.

Accordingly, it can be seen that needs exist for improved protective devices such as lens protectors or covers, and to improved apparatus and methods for installation and removal of such protective devices. It is to the provision of improved protective devices such as lens protectors or covers, and to improved apparatus and methods for installation and removal of such protective devices meeting these and other needs that the present invention is primarily directed.

SUMMARY

In example embodiments, the present invention provides improved protective devices such as lens protectors or covers. In further example embodiments, the present invention provides improved apparatus and methods for installation and removal of such protective devices. Particular example embodiments include a carrier card configured to retain one or more lens protectors in position for placement and installation over an optical lens, and further including a removal tool feature on the carrier card.

In one aspect, the present invention relates to an apparatus for installation and removal of a lens protector to and from a lens. The apparatus preferably includes a carrier configured to retain at least one lens protector in a delivery position for installation of the lens protector onto a lens of a device. The apparatus preferably also includes a removal tool comprising a portion of the carrier and configured for removal of the at least one lens protector from the lens of the device.

In another aspect, the invention relates to an apparatus for installation and removal of a lens protector to and from a lens. The apparatus preferably includes a carrier having a substantially rigid body with a front face and a back face and defining a plurality of chambers formed therein. The apparatus preferably also includes a front film layer applied over the front face of the carrier, and a back film layer applied over the back face of the carrier and removable therefrom. The apparatus preferably also includes a plurality of lens protectors, each lens protector positioned in a corresponding one of the plurality of chambers and retained therein between the front film layer and the back film layer. The apparatus preferably also includes a removal tool comprising a protrusion extending from the carrier.

In still another aspect, the invention relates to a method of installation and removal of a lens protector to and from a lens of a device. The method preferably includes providing a lens protector installation and removal apparatus having a carrier body, a lens protector retained in detachable connection with the carrier body, and a removal tool comprising a portion of the carrier body. The lens protector is preferably configured for installation onto a lens of a device by placement of the carrier body with the lens protector aligned with the lens, engagement of the lens protector onto the lens, and detachment of the lens protector from the carrier body. The removal tool portion of the carrier body is preferably configured for engagement between the lens protector and the device to remove the lens protector from the lens.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 1C is a detailed cross-sectional view of a lens carrier portion of the lens protector carrier, applicator and removal apparatus of FIG. 1 according to an example embodiment of the present invention.

FIG. 3 is a detailed perspective view of the removal tool portion of the lens protector carrier, applicator and removal apparatus of FIG. 1.

FIGS. 4A, 4B and 4C (collectively FIG. 4) show a sequence of operation of a method of installation of lens protectors according to an example embodiment of the present invention.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figures 1A, 1B:
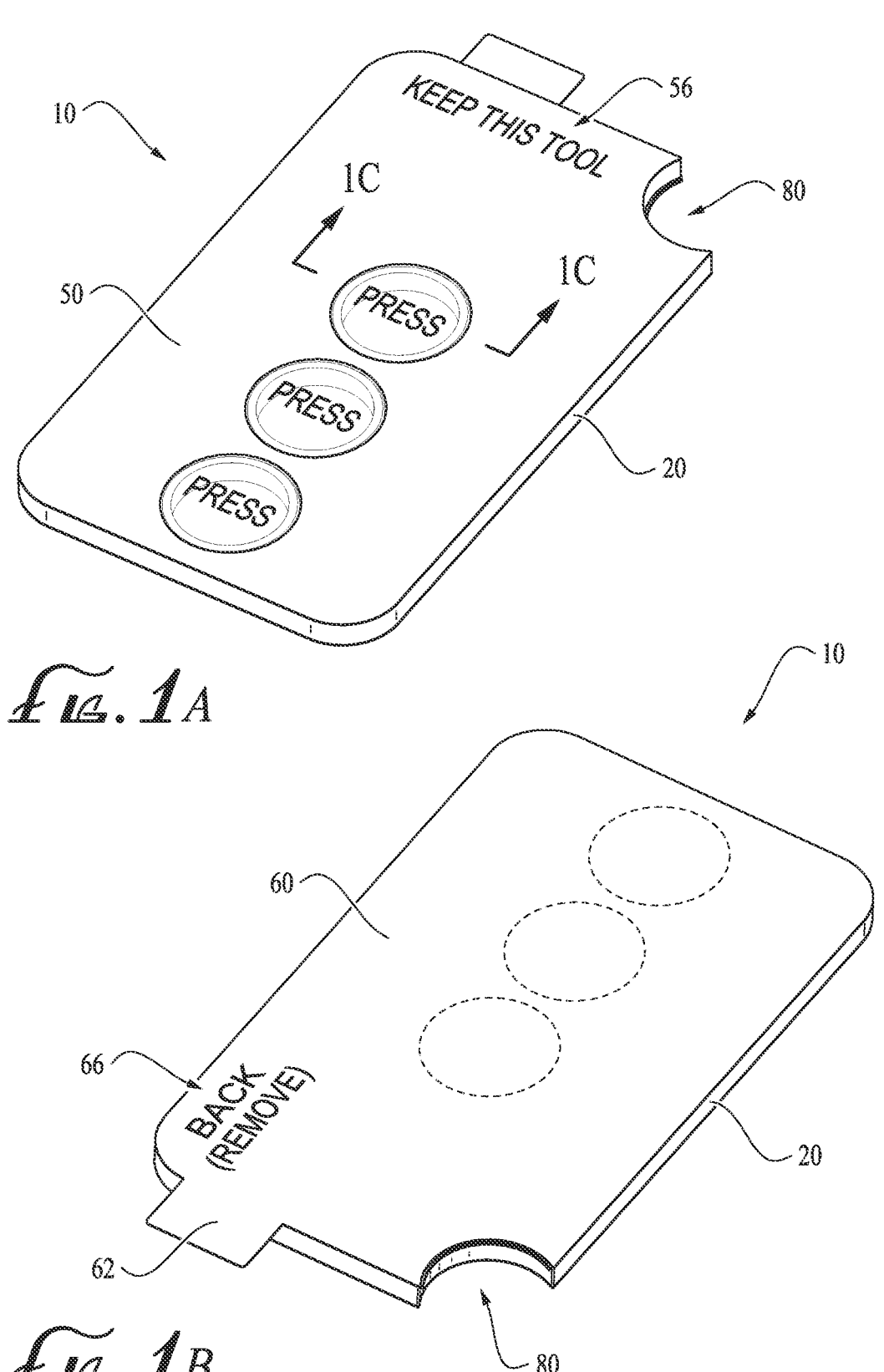
FIG. 1A is a first perspective view of a lens protector carrier, applicator and removal apparatus according to an example embodiment of the present invention.
FIG. 1B is a second perspective view of the lens protector carrier, applicator and removal apparatus of FIG. 1, viewed from the opposite side.
Figures 2A, 2B:
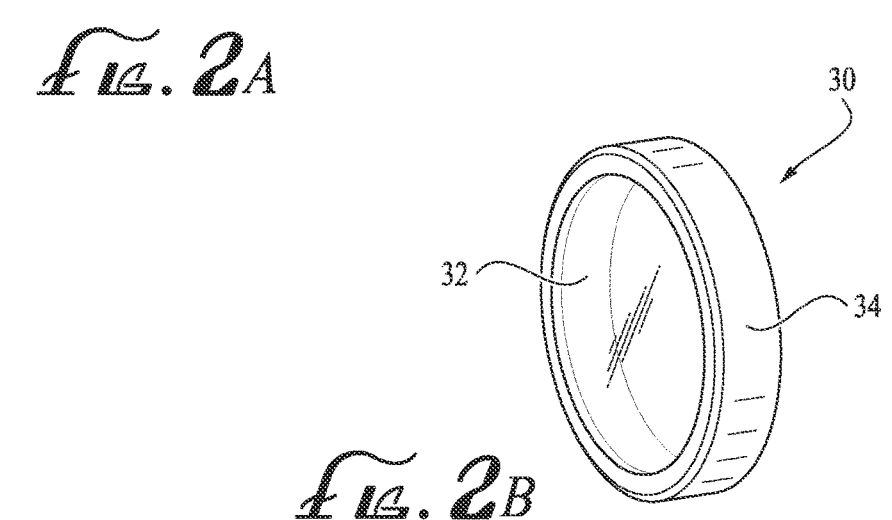
FIG. 2A is an assembly or exploded view showing components of the lens protector carrier, applicator and removal apparatus of FIG. 1 in greater detail.
FIG. 2B is a detailed view of a lens protector element of the apparatus of FIG. 1 according to an example embodiment.

With reference now to the drawing figures, wherein like reference numbers represent corresponding parts throughout the several views, FIG. 1 shows a lens protector carrier, applicator and removal apparatus 10 according to an example embodiment of the present invention. The apparatus 10 includes a carrier card body or panel 20 having one or more (at least one, and optionally a plurality of) openings or chambers 22 for releasably or removably retaining one or more (at least one, and optionally a plurality of) lens protectors or covers 30 therein for delivery and installation onto or over one or more lenses or other protected feature(s) of a cellphone, mobile phone, tablet or laptop computer, camera, magnification device, or other electronic and/or optical device. A front film layer or sheet 50 is applied over a first or front face of the carrier card body 20, including over the one or more chambers 22 and lenses retained therein; and a removable back film layer or sheet 60 is applied over an opposite second or back face of the carrier card body, also including over the one or more chambers and lenses retained therein. The front and back films 50, 60 adhere or attach to the carrier card 20 to cover and protect the lens protectors during storage and transit, and serve to retain the lens protectors in place in the chambers 22 against inadvertent removal until ready to be applied or installed onto or over the lens or other feature to be protected.

In example embodiments, the carrier card body or panel 20 is a generally rectangular planar body having a length, a width and a thickness configured or adapted to be operable with the size and configuration of the lens or other feature to be protected, or to an array of lenses or other features of the protected device. In example embodiments, the carrier card 20 comprises a substantially rigid panel formed of a material having sufficient stiffness and toughness to maintain the lens protector(s) in fixed position during installation, and to apply sufficient force for removal of the lens protectors as described herein. In example embodiments, the carrier card body or panel may comprise a polycarbonate (PC), acrylic (PMMA), and/or other material(s) of construction. In example embodiments, the carrier card body or panel 20 has three convexly curved, rounded or radiused corners, and a fourth corner defining a concavely or inwardly recessed cutout section 80 forming a lens removal tool. In alternate embodiments, two or more of the corners of the carrier card body 20 may comprise cutout sections forming lens removal tools of the same or differing configurations, and/or the cutout tool section may be located along a side or edge of the carrier card body between or away from the corners. In some example embodiments, the cutout section 80 is positioned on a corner generally opposite or a distance away from the openings or chambers 22 in the lengthwise dimension of the carrier card body 20 for improved stiffness and strength when the tool is applied for use in removing a lens cover.

In example embodiments, one or both of the front and back films 50, 60 are configured with a size and shape generally conforming to or matching the size and shape of the carrier card body 20. The front film 50 is attached or adhered to at least a portion of the front face of the carrier card body 20, for example by a low-tack releasable adhesive or electrostatic cling attachment. Alternatively, the front film 50 may be permanently attached to the body 20 by a permanent adhesive. In example embodiments, the adhesive may comprise an acrylic (PMMA) and/or other material(s). The front film 50 optionally includes one or more positional indicators 52 located over corresponding openings or chambers 22 of the carrier card body 20, such as for example, a circular outline generally corresponding to the circumference and position of the lens protectors 30, and/or "PRESS" or other instructional wording within the circular outline as shown in the depicted example embodiment of the drawing figures. In example embodiments, the front film 50 optionally also includes a cutout section 54 generally corresponding to the cutout section 80 of the carrier card body 20. The front film 50 may optionally also be labeled with one or more indicators or instructions for use 56, for example, to remind a user to "KEEP THIS TOOL TO HELP WITH REMOVAL IF NEEDED" or the like. The front film 50, or at least portions thereof in and around the positional indicators 52, is preferably deformable, resiliently flexible, and/or may be perforated or otherwise configured to stretch or tear upon application of a lens cover 30 to a lens or other protected feature during installation. In example embodiments, the front and/or back films may comprise a polyethylene terephthalate (PET), polycarbonate (PC), and/or other material(s) of construction.

In example embodiments, the back film 60 is also configured with a size and shape generally conforming to or matching the size and shape of the carrier card body 20. The back film 60 is attached or adhered to at least a portion of the back face of the carrier card body 20, for example by a low-tack releasable adhesive or electrostatic cling attachment. In example embodiments, the releasable adhesive may comprise a silicone (SI) and/or other material(s). The back film 60 optionally includes a removal tab or gripping portion 62 extending a distance outwardly beyond the periphery of the carrier card body 20 to assist a user in gripping and peeling the back film off of the carrier card body for application and installation of a lens cover 30 to a lens or other protected feature during installation. In example embodiments, the back film 60 optionally also includes a cutout section 64 generally corresponding to the cutout section 80 of the carrier card body 20. The back film 60 may optionally also be labeled with one or more indicators or instructions for use 66, for example, indicating "BACK—ADHESIVE SIDE—REMOVE" or the like. Alternatively or in addition, separate instructions for use may be packaged and provided with the apparatus 10. In example embodiments, the back film may comprise a polycarbonate (PC), acrylic (PMMA), and/or other material(s) of construction.

In example embodiments, the one or more lens protectors or covers 30 take the form of a ring-shaped lens protector or lens cover configured for installation over a camera lens of a mobile phone or other device, with a clear protective cover panel 32 configured to overlie and protect the external optical surface of the camera lens, and with an annular or ring or collar 34 configured to fit around the outer circumference of the lens and hold the protective cover panel in place. In example embodiments, the clear protective cover panel 32 comprises an optically transparent glass or polymeric material, and the annular ring or collar 34 comprises aluminum or other metal. The annular ring or collar 34 may be sized and shaped to have an inner diameter or dimension configured to conform to and fit over a corresponding outer diameter or dimension of a camera lens or other feature to be protected, for example with a close running fit, a push fit, or a light force fit to provide a removable friction fit engagement of the lens protector on the lens or other protected feature; and/or may use a releasable adhesive to provide secure but removable attachment of the lens protector on the lens or other protected feature. In the depicted example embodiment, three generally circular lens protectors or covers 30 are provided, arranged in a generally vertically or axially spaced array of openings or chambers 22 in the carrier card 20. In alternate embodiments, one, two, three, four, or more lens protectors or covers may be provided, arranged singly or in variously configured axial or offset array configurations or arrangements, optionally configured to generally match and align with an array configuration of the camera lenses or other protected features onto which the lens protectors are intended to be installed. In further example embodiments, the lens protectors or covers may be generally circular, generally rectangular, or otherwise shaped and configured.

As seen best with reference to FIG. 1C, a larger front bond surface area SAF of contact is formed between the front film 50 and the front surface of the lens protector 30 (which includes surface area of both the cover panel 32 and surface area of the annular ring 34) relative to a smaller back bond surface area $SA_B$ of contact between the back film 60 and the back surface of the lens protector 30 (which only includes surface area of the annular ring 34). In this manner, the lens protector(s) 30 will remain attached to the front film 50 when the back film is peeled away and removed during the installation process, due to the larger front bond surface area providing a stronger attachment to the lens protector than the smaller back bond surface area, thereby preventing premature dislodging of the lens protector from the chamber 22 of the carrier card 20 until the user is ready to apply and install the lens protector as described in further detail with reference to FIG. 4.

FIG. 3 shows additional details of the recessed cutout section and lens removal tool portion 80 of the carrier card 20. A generally concave or inwardly recessed semicircular curved sidewall 82 extends transversely between the front and back faces of the carrier card along the recessed cutout section 80. A thin removal flange, fin or finger 84 extends a distance outwardly from the sidewall 82, for example forming a curved outwardly projecting member adapted and configured to fit under and around the annular ring 34 of a lens protector 30 and pry or push the lens protector to remove it from the lens as described in further detail with reference to FIG. 5. The removal flange 84 may project outwardly from the sidewall 82 at or adjacent the front or back face of the carrier card 20, or alternatively removal flanges may be provided at or adjacent both the front and back faces of the carrier card.

Figures 4B, 4C:
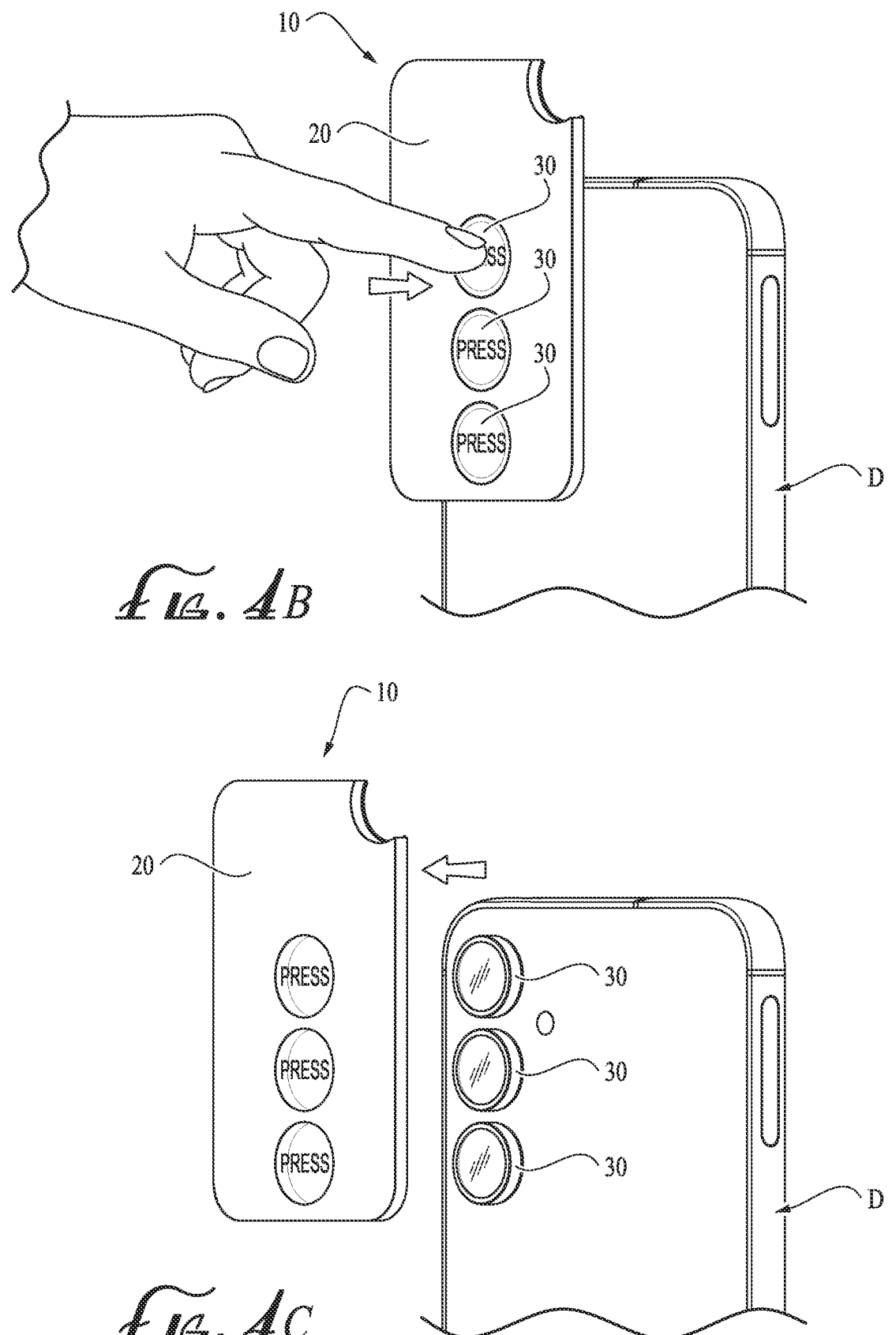

FIGS. 4A, 4B and 4C (collectively FIG. 4) show a sequence of operation of a method of installation of one or more lens protector(s) 30 onto one or more lens(es) L or other protected feature(s) of a device D such as a mobile phone, tablet computer, camera, or other electronic and/or handheld device, according to an example embodiment of the present invention. As shown in FIG. 4A, a user removes the back film 60 by gripping the removal tab 62 and peeling the back film away from and off of the carrier card 60 to expose the backs of the lens protector(s) 30. The larger surface area SAF of adhesive contact between the front film 50 and the front surface of the lens protector 30 relative to the smaller surface area $SA_B$ of contact between the back film 60 and the back surface of the lens protector allows the back film to be removed without displacing the lens protectors from the retention chambers 22 of the carrier card 20. Optionally, the user may clean the lens L as desired to remove fingerprints or dust prior to installation of the lens protector. Then as shown in FIG. 4B, the user positions the carrier card 20 with one or more lens protector(s) 30 aligned in position over one or more corresponding lens(es) L or other protected features of the device D. In example embodiments including a plurality of lens protectors in an array corresponding to an array of lenses, the plurality of lens protectors are aligned in arrayed position over the plurality of lenses, with each lens protector positioned over a respective corresponding lens. In alternate embodiments, a single lens protector 30 can be installed onto a single lens L, and/or multiple individual lens protectors can be separately installed onto multiple lenses of a device. The user then pushes each lens protector 30 onto it's corresponding lens L, for example with finger pressure as indicated by the direction arrow in FIG. 4B. The carrier card 20 is then removed by retracting it away from the device D, as shown in FIG. 4C, leaving the lens protectors 30 engaged in place in a protective configuration on the lenses L of the device. In example embodiments, the annular ring or collar 34 of the lens protector 30 fits sufficiently closely over and onto the lens L, such that a frictional engagement between the interior surface of the lens protector collar and the exterior surface of the lens is sufficient to retain the lens protector in place on the lens as the carrier card 20 is removed, and during extended use of the device D with the lens protector installed. In other embodiments, a releasable adhesive is optionally provided between the lens protector collar and the lens to retain the lens protector in the installed protective configuration during extended use. The frictional and/or adhesive engagement between the lens protector 30 and the lens L in the installed protective configuration is preferably sufficiently stronger than the bond between the lens protector and the front film 50 at the front surface area SAF, so that removal of the carrier card 20 detaches the lens protector from the front film without causing disengagement or repositioning of the lens protector from the lens. Alternatively or additionally, the user figure pressure as indicated in the step of FIG. 4B assists in detachment of the lens protector 30 from the front film 50 and positioning and engagement of the lens protector onto the lens L. Once installed, the lens protector 30 protects the lens L from scratches, chipping or other damage during normal use of the device. In some example embodiments, the device D may have multiple (for example, three) lenses that are identical and equally spaced and/or symmetrically arranged, such that the consumer can apply or install the lens protectors in two or more mirrored or different orientations of the lens protector apparatus, for example top-to-bottom or bottom-to-top, or left-to-right or right-to-left. In other example embodiments, the lenses of the device may not be identical or equally spaced or symmetrical, and the protector apparatus may optionally have an alignment or indexing feature such as a directional arrow, text instructions, and/or other symbol or image, to assist the user in installation of the lens protectors in the correct orientation and ensure that the protectors are installed in a configuration or orientation that matches the device camera lens configuration or orientation.

Figures 5A, 5B:
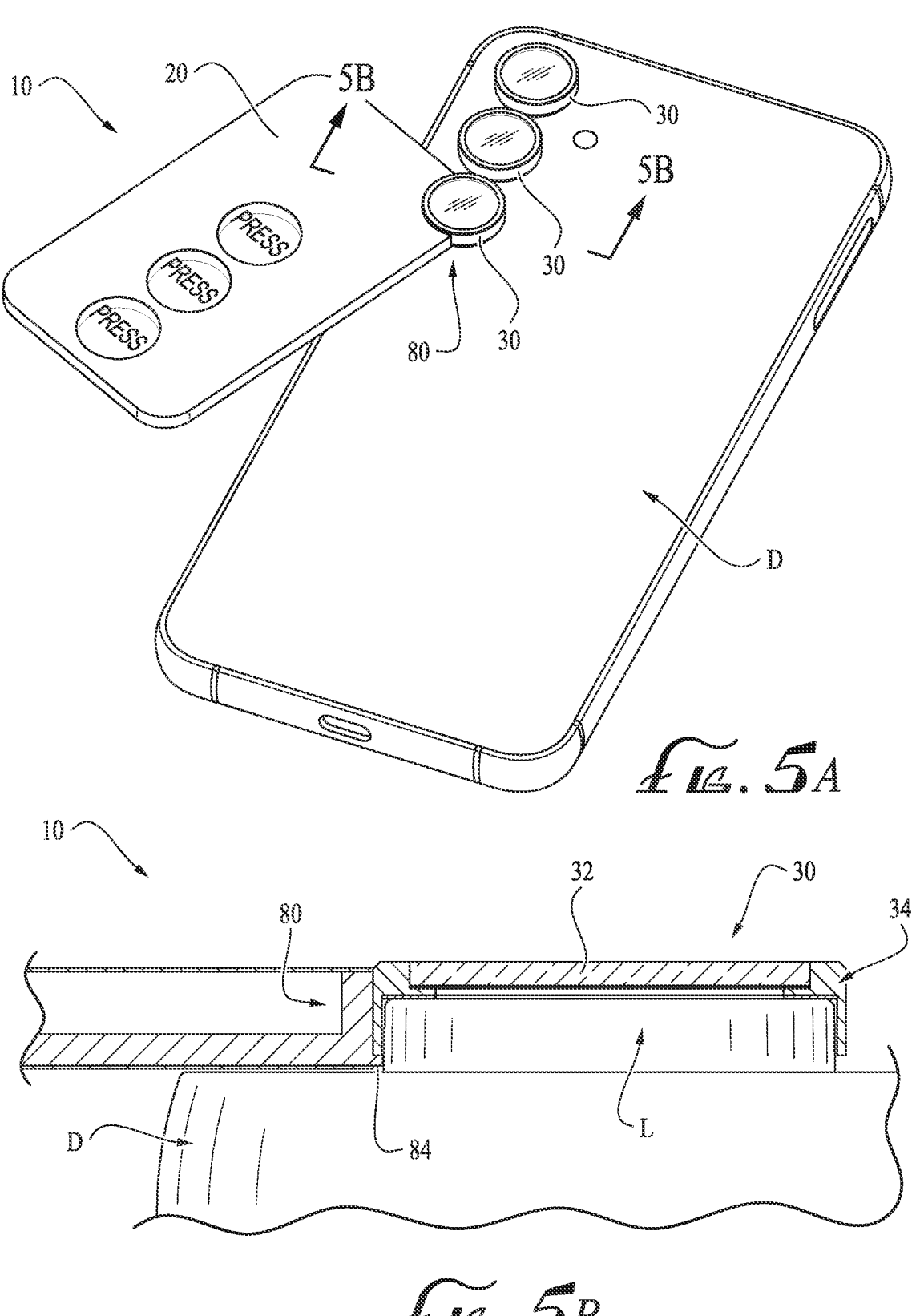
FIGS. 5A, 5B, 5C, 5D and 5E (collectively FIG. 5) show a sequence of operation of a method of removal of lens protectors according to an example embodiment of the present invention.
Figure 5C:
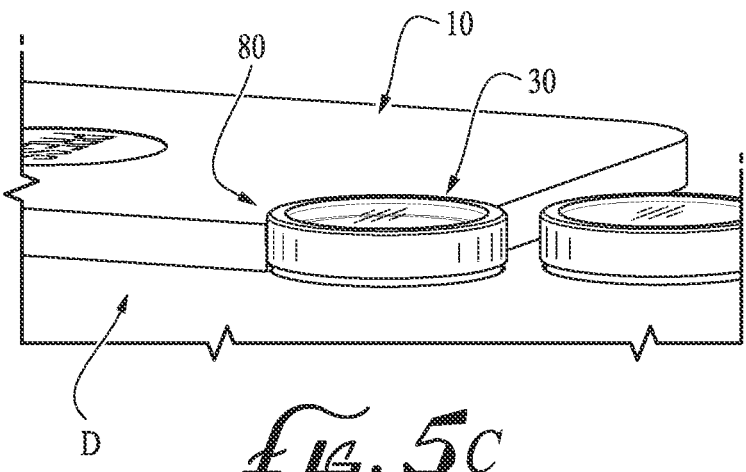
Figure 5D:
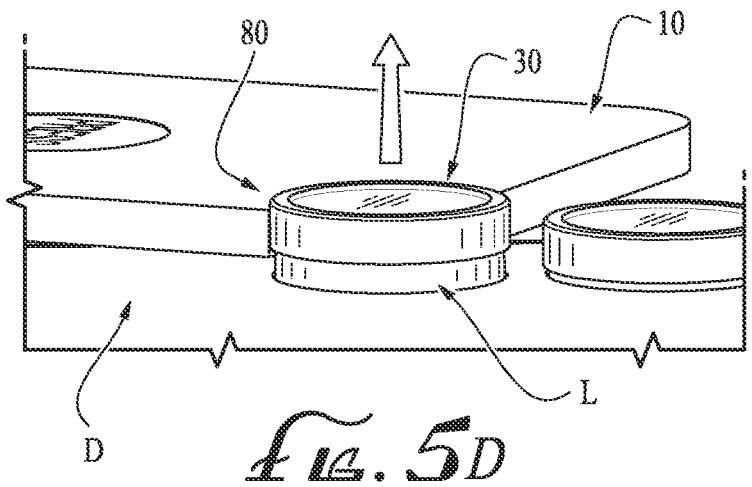
Figure 5E:
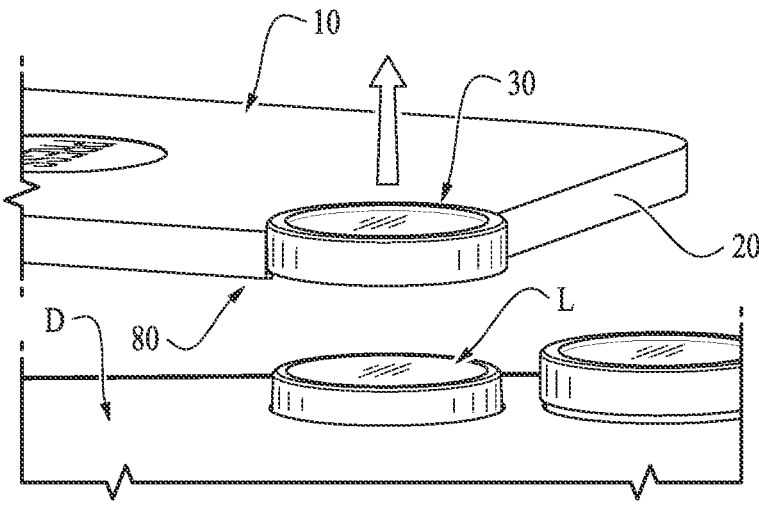

FIGS. 5A, 5B, 5C, 5D and 5E (collectively FIG. 5) show a sequence of operation of a method of removal of a used lens protector 30 from a lens L of a device D using a removal tool according to an example embodiment of the present invention. The lens protector removal tool preferably comprises a part of the same or a substantially similar or identical like apparatus used in the delivery and installation of the lens protector onto the lens, for example an integral portion of the carrier card 20, such that installation and removal elements of the apparatus are integral parts of a one-piece or unitary component. As shown in FIGS. 5A, 5B and 5C, the lens protector is removed from the lens L of the device D by positioning the carrier card 20 with its cutout section removal tool portion 80 engaged with the lens protector 30 to be removed. In example embodiments, the internal surface of the concave arcuate sidewall 82 is configured with a size and shape closely conforming to the corresponding convex external curvature of the sidewall of the annular ring or collar 34 of the lens protector 30. The removal flange 84 is inserted and engaged between the lens protector 30 and the lens L or other portion of the device D. In example embodiments, the depth of the collar 34 of the lens protector 30 is less than the depth of the lens L, such that a small gap or space is formed between the rim of the collar 34 of the installed lens protector 30 and the back face of the device D, into which the removal flange 84 can be received. The user then manually lifts and/or pries the carrier card 20 upwardly, as indicated in FIGS. 5D and 5E, to apply a lifting force or moment away from the device D to disengage and remove the lens protector 30 from the lens L of the device D. The length of the carrier card 20 provides leverage allowing the lens protector 30 to be readily removed with light to medium hand pressure, and the curvature of the removal tool portion 80 distributes the removal force over an extended peripheral area of the lens protector, thereby avoiding application of excess or concentrated forces that might damage the lens L or device D. The positioning of the removal tool portion 80 at a corner region of the carrier card allows the removal tool to have sufficient clearance for engagement with lens covers on lenses at any position within a lens array, for example at top, middle and bottom positions (or inner and outer positions) within a linearly spaced or otherwise configured lens array. The used lens protector may optionally be replaced with a new lens protector, installed in similar fashion as described above, and the used lens protector disposed of or recycled. In some example modes or methods of use, the lens protector removal tool used for removal of a used lens protector is part of the apparatus previously used for installation of that used lens protector. In other example modes or methods of use, the lens protector removal tool used for removal of a used lens protector is part of the apparatus that will be used for installation of a new lens protector.

While the invention has been described with reference to example embodiments, it will be understood by those skilled in the art that a variety of modifications, additions and deletions are within the scope of the invention, as defined by the following claims.

What is claimed is:

1. An apparatus for installation and removal of a lens protector to and from a lens, the apparatus comprising:

a carrier configured to releasably retain at least one lens protector in a delivery position for installation of the lens protector onto a lens of a device, and configured to release the at least one lens protector from the carrier upon engagement of the lens protector onto the lens of the device, whereby the at least one lens protector remains engaged onto the lens of the device and separates from the carrier upon application and removal of the carrier to and from the device; and a removal tool comprising a portion of the carrier and configured for removal of the at least one lens protector from the lens of the device, the removal tool comprising a cutout section at a corner region of the carrier defining a concave arcuate sidewall configured with a size and shape conforming to an external curvature of the at least one lens protector, and a removal flange projecting outwardly from the concave arcuate sidewall configured for engagement between the at least one lens protector and the device for removal of the at least one lens protector from the lens of the device.

2. The apparatus of claim 1, wherein the carrier comprises a body defining at least one chamber configured to releasably retain the at least one lens protector in the delivery position.

3. The apparatus of claim 2, wherein the carrier defines a plurality of chambers, each chamber configured to releasably retain a respective lens protector in an array for positioning and delivery onto a plurality of lenses of the device.

4. The apparatus of claim 3, wherein the device comprises a plurality of identical and equally spaced lenses, and wherein the lens protectors may be installed on the lenses in different mirrored orientations of the apparatus.

5. The apparatus of claim 3, wherein the device comprises an alignment feature indicating a correct orientation of the apparatus for installation of the lens protectors.

6. The apparatus of claim 2, further comprising at least one film layer applied to the carrier and retaining the at least one lens protector in the delivery position within the at least one chamber.

7. The apparatus of claim 6, wherein the at least one film layer comprises a front film layer applied to a front face of the carrier and a back film layer applied to a back face of the carrier, and wherein the at least one lens protector is retained in the delivery position within the at least one chamber and between the front film layer and the back film layer.

8. The apparatus of claim 7, wherein the back film layer is removably attached to the carrier.

9. The apparatus of claim 8, wherein the back film layer comprises a removal tab extending beyond a side of the carrier to assist in removal of the back film layer from the carrier.

10. The apparatus of claim 8, wherein a front surface area of attachment is defined at a contact area between the at least one lens protector and the front film layer, and wherein a back surface area of attachment is defined at a contact area between the at least one lens protector and the back film layer, and wherein the front surface area of attachment is substantially greater than the back surface area of attachment.

11. The apparatus of claim 10, wherein a friction fit is formed between the lens protector and the lens of the device upon installation, and wherein a frictional engagement force between the lens protector and the lens is substantially greater than a detachment force required to detach the lens protector from the front film layer at the front surface area of attachment.

12. The apparatus of claim 1, wherein the removal flange comprises an arcuately curved flange projecting outwardly from the concave arcuate sidewall at or adjacent one of a front or a back face of the carrier.

13. The apparatus of claim 1, wherein the removal tool comprises an integral part of the carrier.

14. An apparatus for installation and removal of a lens protector to and from a lens, the apparatus comprising:
  a carrier comprising a substantially rigid body having a front face and a back face, and defining a plurality of chambers formed therein;
  a front film layer applied over the front face of the carrier;
  a back film layer applied over the back face of the carrier and removable therefrom;
  a plurality of lens protectors, each lens protector positioned in a corresponding one of the plurality of chambers, and releasably retained therein between the front film layer and the back film layer in a delivery position configured for installation of the lens protectors onto corresponding lenses of a device, and configured to release the lens protectors from the carrier upon engagement of the lens protectors onto the lenses of the device, whereby the lens protectors remain engaged onto the lenses of the device and separate from the carrier upon application and removal of the carrier to and from the device; and
  a removal tool comprising a portion of the carrier and configured for removal of the lens protectors from the lenses of the device, the removal tool comprising a cutout section at a corner region of the carrier defining a concave arcuate sidewall configured with a size and shape conforming to an external curvature of the lens protectors, and a removal flange projecting outwardly from the concave arcuate sidew al configured for engagement between the lens protectors and the device for removal of the lens protectors from the lens of the device.

15. The apparatus of claim 14, wherein the carrier body is substantially rectangular.

16. The apparatus of claim 14, wherein the back film layer comprises a removal tab extending beyond a side of the carrier body to assist in removal of the back film layer.

17. The apparatus of claim 14, wherein a front surface area of attachment is defined at a contact area between each lens protector and the front film layer, and wherein a back surface area of attachment is defined at a contact area between each lens protector and the back film layer, and wherein the front surface area of attachment is substantially greater than the back surface area of attachment.

18. The apparatus of claim 14, wherein a friction fit is formed between the lens protector and the lens upon installation, and wherein a frictional engagement force between the lens protector and the lens is substantially greater than a detachment force required to detach the lens protector from the front film layer.

19. The apparatus of claim 14, wherein the removal teel flange comprises an arcuately curved flange projecting outwardly from the concave arcuate sidewall at or adjacent one of the front or back faces of the carrier.

20. The apparatus of claim 14, wherein the removal tool comprises an integral part of the carrier body.

21. A method of installation and removal of a lens protector to and from a lens of a device, the method comprising:
  providing a lens protector installation and removal apparatus having a carrier body, a lens protector retained in detachable connection with the carrier body, and a removal tool comprising a portion of the carrier body;
  wherein the lens protector is configured for installation onto a lens of a device by placement of the carrier body with the lens protector aligned with the lens, engagement of the lens protector onto the lens, and detachment of the lens protector from the carrier body, whereby the lens protector remains engaged onto the lens of the device and separates from the carrier body u application and removal of the carrier body to and from the device; and
  wherein the removal tool portion of the carrier body comprises a cutout section at a corner region of the carrier body defining a concave arcuate sidewall configured with a size and shape conforming to an external curvature of the lens protector, and a removal flange projecting outwardly from the concave arcuate sidewall for engagement between the lens protector and the device to remove the lens protector from the lens.

\* \* \* \* \*